(12) United States Patent
Ji et al.

(10) Patent No.: US 6,714,906 B1
(45) Date of Patent: Mar. 30, 2004

(54) RAPID PHASE IDENTIFICATION METHOD

(75) Inventors: Johnson Ji, Shanghai (CN); David Ho, Chung Ho (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/419,227

(22) Filed: Oct. 15, 1999

(30) Foreign Application Priority Data

Dec. 21, 1998 (TW) .................................... 87121364 A

(51) Int. Cl.$^7$ ................................................ G06F 17/21
(52) U.S. Cl. ................................. 704/10; 715/532
(58) Field of Search .................. 704/9, 10; 715/530, 715/531, 532, 533, 536; 707/3

(56) References Cited

U.S. PATENT DOCUMENTS

| | | | | |
|---|---|---|---|---|
| 4,342,085 A | * | 7/1982 | Glickman et al. ............ 715/532 |
| 5,323,316 A | * | 6/1994 | Kadashevich et al. ......... 704/9 |
| 5,369,577 A | * | 11/1994 | Kadashevich et al. ......... 704/9 |
| 5,475,587 A | * | 12/1995 | Anick et al. ................... 704/9 |
| 5,708,829 A | * | 1/1998 | Kadashevich et al. ....... 715/531 |
| 5,835,888 A | * | 11/1998 | Kanevsky et al. ............. 704/9 |
| 5,983,223 A | * | 11/1999 | Perlman ........................ 707/6 |
| 5,999,949 A | * | 12/1999 | Crandall ..................... 715/532 |
| 6,347,298 B2 | * | 2/2002 | Vitale et al. ................ 704/260 |
| 6,430,557 B1 | * | 8/2002 | Gaussier et al. ............. 707/5 |

* cited by examiner

*Primary Examiner*—Patrick N. Edouard
(74) *Attorney, Agent, or Firm*—Pro-Techtor International

(57) ABSTRACT

The invention provides a rapid phrase identification method, especially for Spanish derivatives. The main concern of the present invention is to provide for an electronic Spanish dictionary device a means for quickly identifying a derivative without demanding large memory space for storing all the Spanish vocabulary, etymons and derivatives. All the transformation rules from etymons to derivatives have been collected, classified and reversed to give reversion rules. These reversion rules are sorted and indexed into a look-up table for searching. A rapid searching method pursuant to this look-up table is proposed.

18 Claims, 7 Drawing Sheets

>qui
quicio
quid

>quiero
quieto
quietud querer
[vt] I (amar) to love ⓪
II 1 (a) (expresando
deseo, intención,

RAPID PHASE IDENTIFICATION METHOD

BACKGROUND OF THE INVENTION

1. Field of the Invention

The present invention relates to a rapid phrase identification method and, in particular, to a rapid identification method of Spanish derivatives in a programmed electronic device, such as an electronic dictionary, or in software, such as a phrase processing program or a computer-based dictionary. The invention can also be utilized to proceed spelling check and correction.

2. Description of the Related Art

For many types of electronic dictionaries or computer-based dictionaries, if an inquiry item entered by the user can not be found in the database, the user will receive a negative response, such as "no such item" or "phrase not found", or get the closest phrase in spelling or pronunciation. However, sometimes, apart from misspelling, the inquiry item may be derivatives or compounds of elementary phrases, so-called etymons, and are not included in the database. Therefore, the responses like the above-mentioned ones seem improper and useless.

It should be pointed out that European languages such as Spanish and Germany usually have a variety of derivatives for a single phrase; especially for Spanish, a verb may have more than one hundred derivative forms. In Spanish, the vocabulary can be classified as etymons, compounds, derivatives and combinations thereof. Basically, an etymon is an elementary phrase on its own; a compound is formed by combining two or more etymons, or attaching a prefix to an etymon; and a derivative is derived from changing an infix or a suffix or both of an etymon. Currently, usual electronic dictionaries only collect the etymons and a few common derivatives of them, which is obviously far from satisfaction for practical uses.

A trivial solution to this problem is to include all the derivatives for each etymon in the electronic dictionary. Nevertheless, this method will demand large memory space to store all Spanish vocabulary, which is wasteful and requires much effort to input relevant data. Thus, it is greatly desirable if a more efficient method with less memory requirement can be provided for phrase identifying, searching and checking in a device like an electronic Spanish dictionary or computer software such as the Spanish phrase processing program.

SUMMARY OF THE INVENTION

In observation of the disadvantages in traditional phrase identification devices or software, the instant invention provides a rapid phrase identification method.

An object of the invention is to provide a rapid searching method for Spanish derivatives.

Further, according to the present invention, a coding method is provided for rapidly searching of Spanish derivatives in a computer or the phrase processing software.

The invention also provides an efficient method of checking Spanish vocabulary spelling and correcting the misspelled inquiry item by providing a list of possible candidates close to the inquiry item in spelling or pronunciation.

To embody of the present invention, the following steps have been carried out:

(1) collecting and categorizing all the rules for obtaining Spanish derivatives of each etymon;

(2) indexing these rules by a coding method; and (3) sorting the indexed rules and forming a look-up table.

Furthermore, according to the invention, the searching procedure for each inquiry item is:

(1) to look it up in the etymon database, and output the stored data concerning the phrase if found, then stop; otherwise (2) to check its affix with the derivative affix look-up table, and output the stored data concerning its possible etymons if any, then stop; otherwise (3) to correct the spelling by providing a list of close phrases in spelling or pronunciation.

Yet further, according to the invention, the searching of each possible suffix-type derivative may be fulfilled by using a phrase transposition method; wherein, the letters of the phrase is firstly transposed in order. Thereby, one is able to obtain from the beginning of the transposed phrase all the possible suffixes, in reversed order though. Then check the obtained suffixes with known ones by resorting to the look-up table prepared beforehand. Keep the matched one in accordance with the maximal matching principle, find out the corresponding etymon suffixes and substitute them for the suffixes in the inquiry phrase to get the candidate etymons. Finally, look these etymons up in the basic database and see if any of them exists in the dictionary.

DETAILED DESCRIPTION OF THE INVENTION

To solve the problem of recognizing a derivative, the Spanish derivative transformation rules of phrases have been classified according to their phrase classes (or categories). The following are some examples for respective phrase classes:

(1) Plural nouns:
+'s', in general;
+'es', if the phrase ends with a consonant; and
examples of irregular transformations:
'z'→'ces',
Rubi→Rubies,
Bistri→bisturies,
Bambu→bambues,
Jersey→jerseys, etc.

(2) Adjectives:
   There are masculine and feminine adjectives. Therefore, for example, each adjective ending with an o can have four forms ended with 'o', 'a', 'os', and 'as' respectively; while some adjectives ending with consonants may have derivatives ending with 'a', 'as', or 'es' in addition to their original forms.

(3) Adverbs:
   One type of adverbs is derived from changing the corresponding adjectives into their feminine forms followed by adding 'mente' to the end. Therefore the declension is 'o'→'amente'.

(4) Verbs:
   This is the most complicated case. In Spanish, each verb can have more than one hundred transformations. After excluding unusual ones not used in modern Spanish, there are still about sixty derivatives for a single verb, and many of the transformation rules are irregular, both in suffixes and in infixes.

Table 1 is a partial list of the affix transformations collected in the present invention.

TABLE 1

| Types of transformation | Affixes of derivatives | Substitutive affixes |
|---|---|---|
| 1. Declensions of verbs | A | o, ar, er, ir |
| | Aba | Ar |
| | Abais | Ar |
| | Abamos | Ar |
| | ... | ... |
| 2. Irregular inflections of verbs | He | Haber |
| | Has | Haber |
| | ha | Haber |
| | hemos | haber |
| | ... | ... |
| 3. Irregular inflections of plural nouns | ces | z |
| | ... | ... |
| 4. Transformations from adjectives to adverbs | amente | o |
| | ... | ... |
| 5. Middle inflections of verbs | ar | ac |
| | br | b |
| | c | z, qu |
| | dr | d, n |
| | Habéis | haber |

Figure 1:
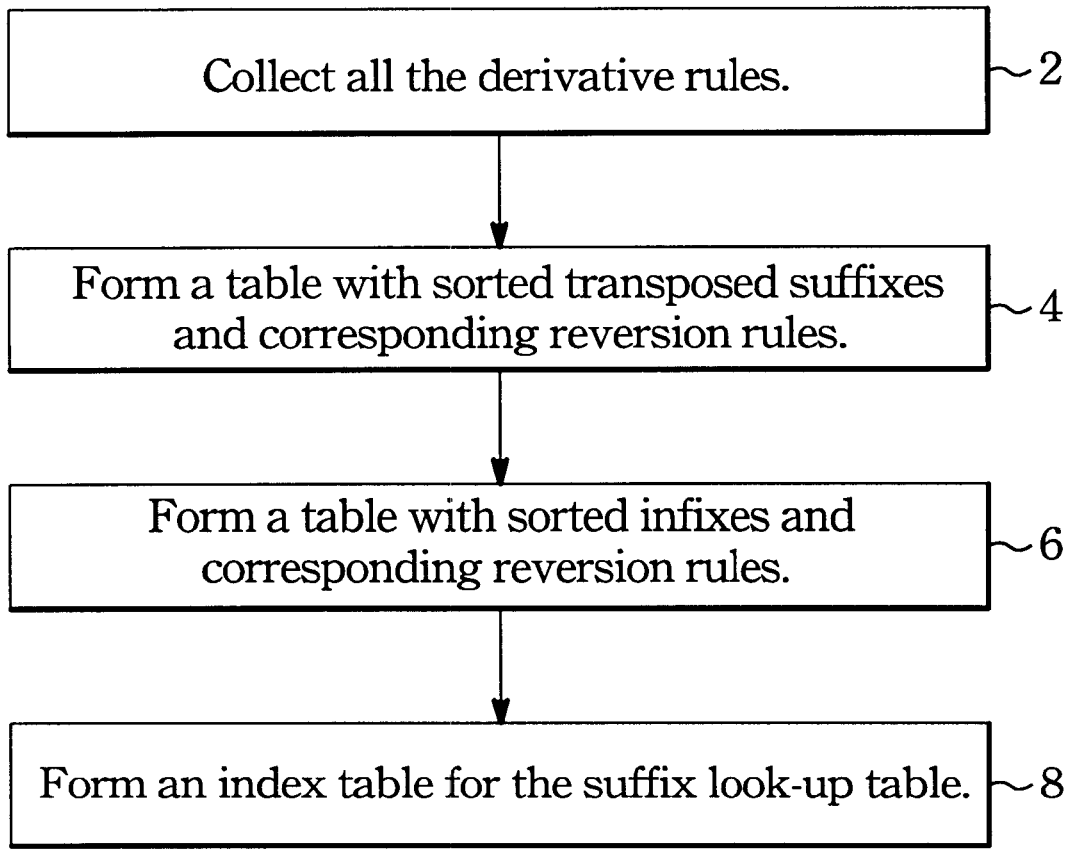
FIG. 1 is a procedure diagram of forming a look-up table with rules reverting Spanish derivatives to their etymons according to the invention.

There are about 2400 such transformation rules in Spanish, including rules for declension (transformations of suffixes), rules for infix inflection (transformations of infixes), and rules for both declension and infix inflection simultaneously. A look-up table can be formed with all the reversion rules in such a manner that for a specific derivative infix (or suffix) one can find out all possible infixes (or suffixes) from the original phrase (Step 2 in FIG. 1). In other phrases, for each derivative infix (or suffix) there is a number of associated etymon infixes (or suffixes). In particular, the letters of the suffixes in the look-up table are transposed in order, and these transposed suffixes are sorted alphabetically (Step 4). A similar sorting is also done with the infixes (Step 6). This will substantially facilitate the speed of the following search procedures. One preferred embodiment of the present invention is also to index these rules according to a coding method for the alphabetically sorted derivative suffixes (Step 8), instead of naively grouping all of them into a big table. Consequently, the look-up table obtained consists of three parts, one is a portion of the alphabetically ordered index table for the suffix reversion rule table (Table 2), another is a portion of the suffix reversion table (Table 3) and the other is a portion of the infix reversion table (Table 4).

TABLE 2

| Alphabet | Lower limit | Upper limit |
|---|---|---|
| I | 37 | 37 |
| J | — | — |
| K | — | — |
| L | 38 | 38 |
| M | — | — |
| N | 39 | 73 |
| O | 74 | 96 |
| P | — | — |
| Q | — | — |
| R | 97 | 98 |
| S | 99 | 193 |
| T | — | — |
| U | — | — |

TABLE 3

| Transposed derivative suffixes | Substitutive etymon suffixes |
|---|---|
| nárd | er, ir |
| o | ar, er, ir, r |
| oda | ar |
| odi | er, ir |
| odna | ar |
| odne | er, ir |
| odnei | er, eír, ir |
| odney | er, ir |
| og | cer, er, ir, cir, r |
| ogi | er |
| ohce | acer |
| oj | er, cir |
| oserpmi | imprimir |
| otircse | escribir |
| otirf | freír |
| otleuv | volver |
| otor | romper |
| otreiba | abrir |
| otreum | morir |
| otseup | poner |
| otsiv | ver |
| otsivorp | proveer |
| ovu | ar |
| oy | ir |
| raey | er, ir |

TABLE 4

| Derivative infixes | Substitutive etymon infixes |
|---|---|
| i | e |
| ic | ac |
| ie | e |
| is | er |
| iz | ac |
| j | g |
| o | u |
| qu | c |
| ub | ab |
| ue | o |
| ue | u |
| up | ab |
| us | on |
| uv | en |
| ye | e |
| z | c |
| zc | c |
| zg | c |

With such a table at hand, for a specific phrase not directly found in a Spanish dictionary or the basic database of an electronic dictionary, one could then construct its candidate etymons by substituting all possible infixes (or suffixes) given in the reversion rules for the derivative infix (or suffix) and see if any of these candidates can be identified within the elementary etymon database.

The present invention can be equally well applied to an electronic Spanish dictionary, Spanish phrase processing software or the like; however, to be specific, this specification will exclusively use the electronic Spanish dictionary as the example for demonstration purpose only.

Figure 2:
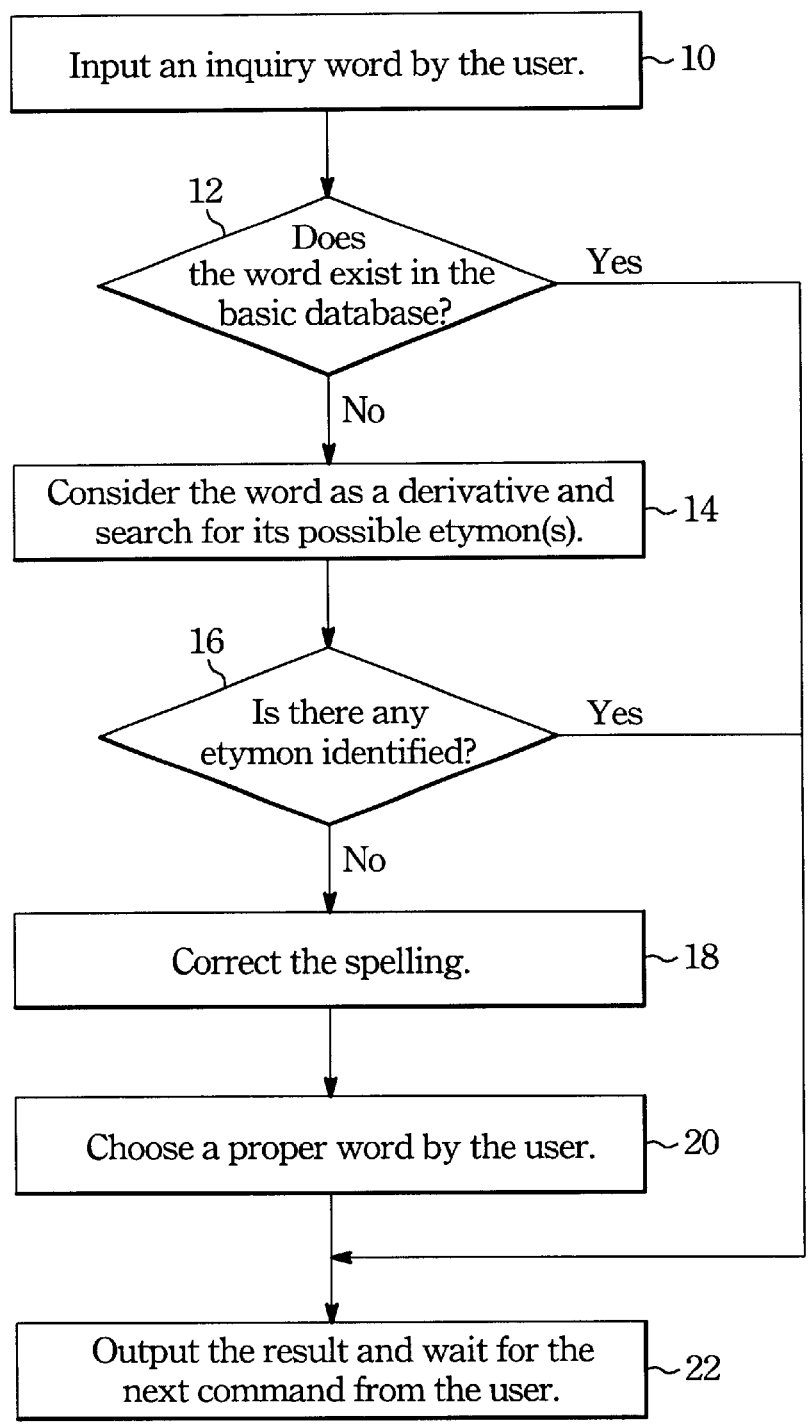
FIG. 2 is a flow chart of the typical phrase searching procedure of a Spanish electronic dictionary according to the present invention.

FIG. 2 is a flow chart of the typical phrase searching procedure of a Spanish electronic dictionary according to the present invention. First, the user will be asked to enter an inquiry phrase. (Step 10) After receiving the inquiry item, the electronic dictionary will look up its basic database, usually containing the etymons and their popularly used derivatives, for identical item in spelling (Step 12). If the inquiry item exists in the database, the electronic dictionary will output the data concerning the item directly, then terminate the searching process and wait for the next command from the user (Step 22).

Figure 3:
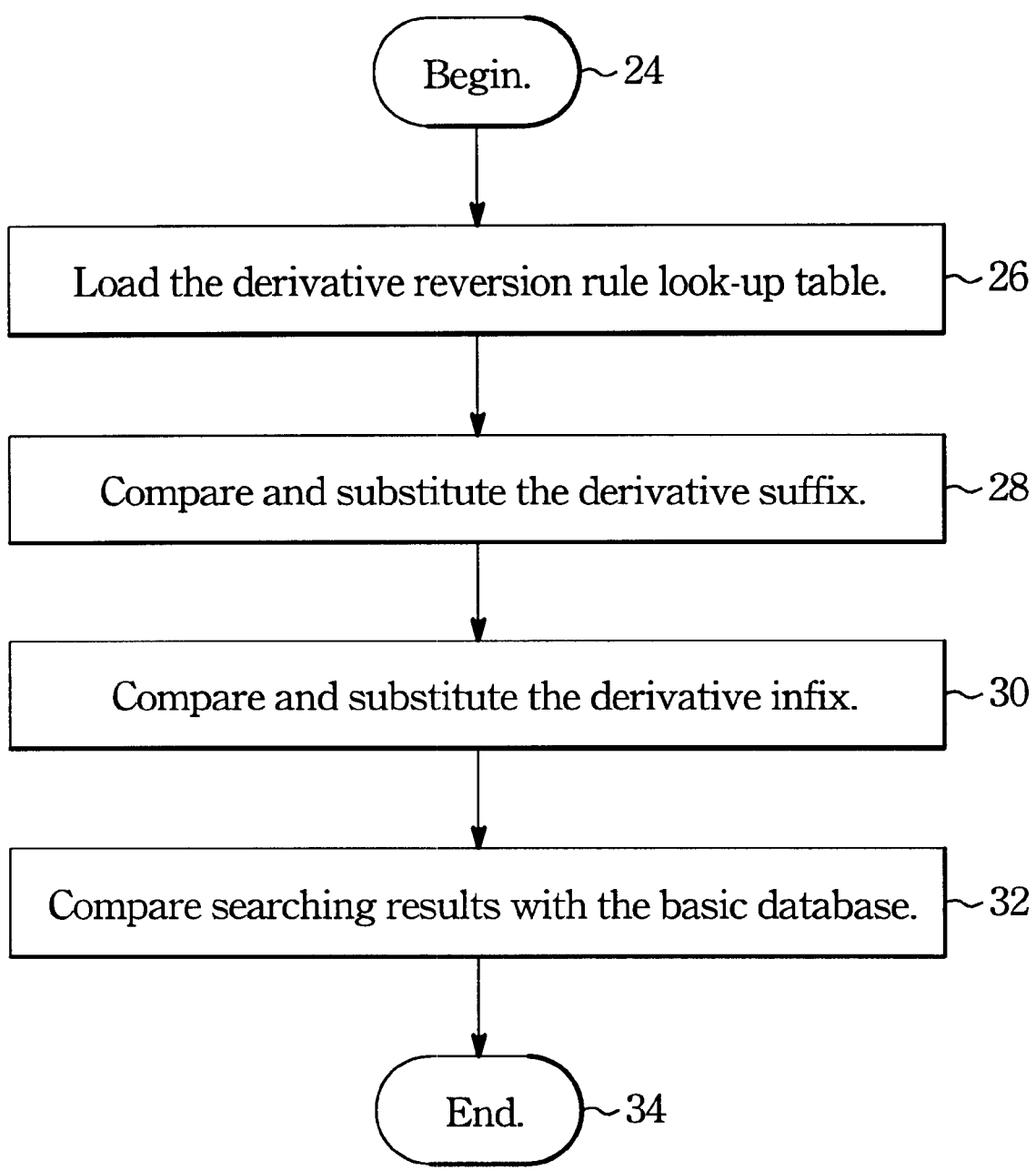
FIG. 3 is a diagram with functional blocks describing the subroutine about how a derivative can be identified in the invention.

If the inquiry item cannot be found in the elementary database, the derivative identifying subroutine, which is delineated in FIG. 3, is then called to set forth (Step 1). First, the affix look-up table will be loaded (Step 26), then the suffix and infix searches and comparisons are executed in order (Step 28 and 30), and the results will be checked with the basic database in the end (Step 32).

Figure 4A:
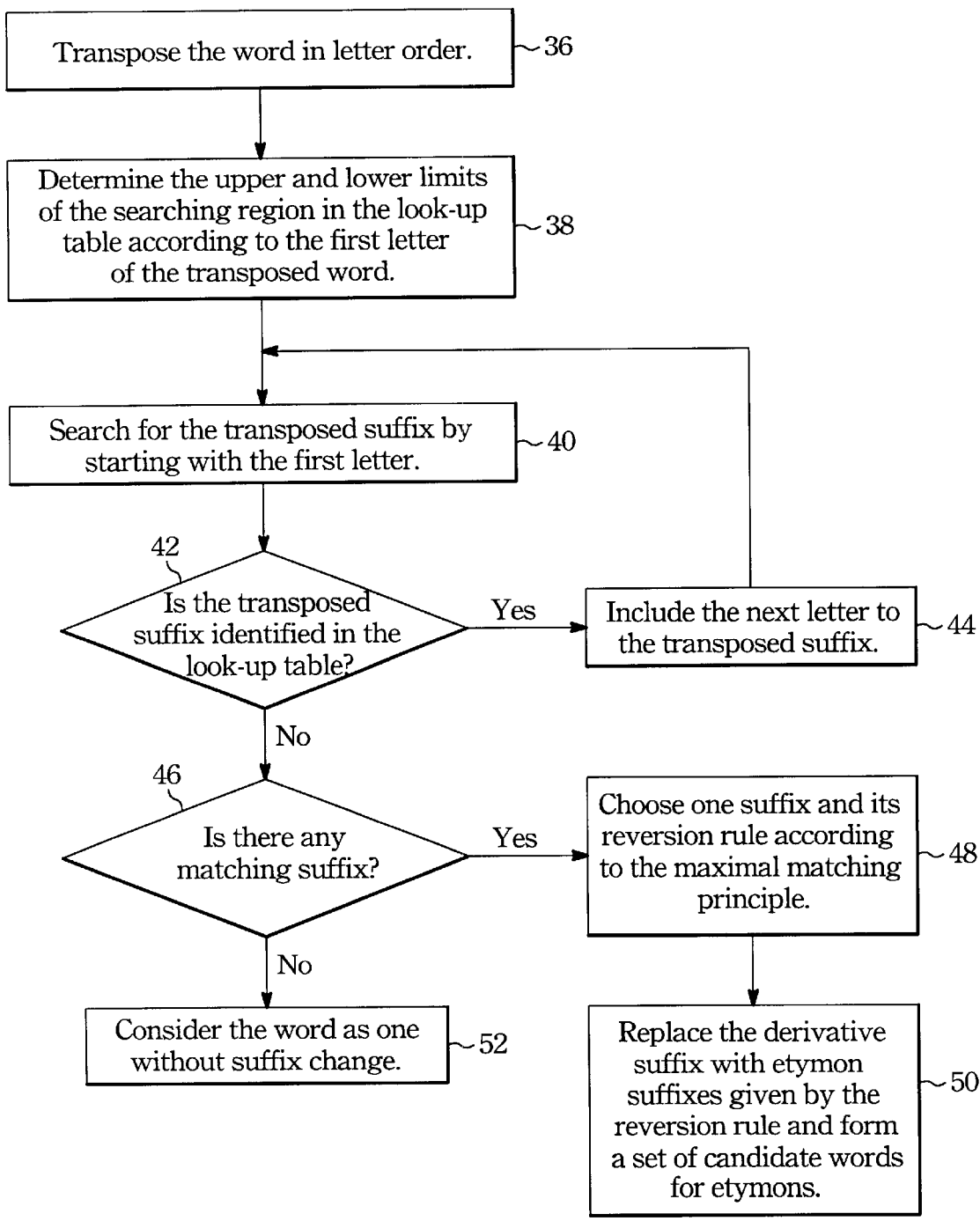
FIG. 4A is a flow chart of the subroutine for searching the suffix reversion rule of an inquiry item.
Figure 4B:
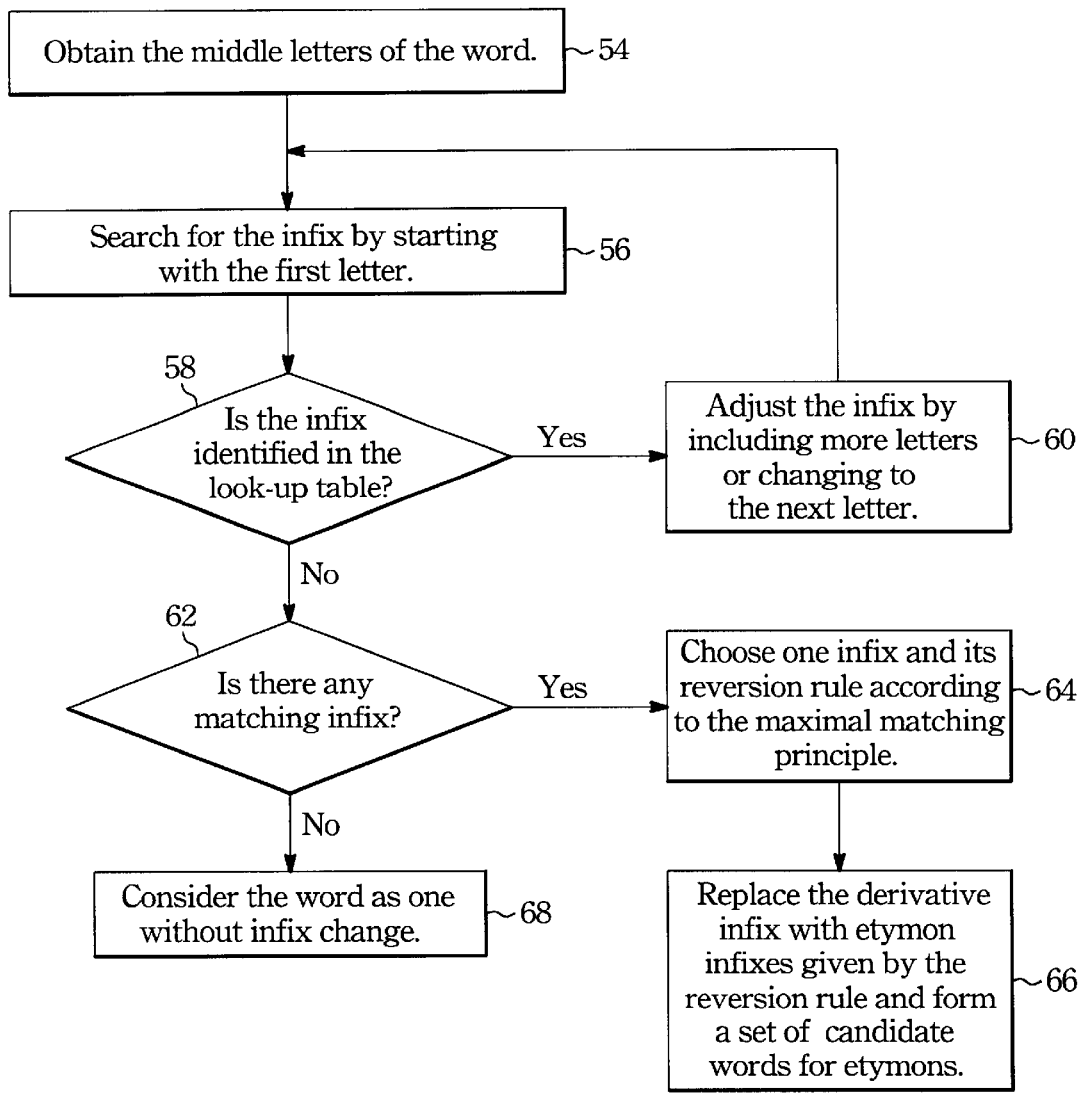
FIG. 4B is a flow chart of the subroutine for searching the infix reversion rule of an inquiry item.

FIG. 4A and 4B depict the flowcharts of the searching procedures of suffix-type and infix-type derivatives, respectively. For a preferred embodiment in accordance with the instant invention, the letters of the inquiry item will be transposed in order (Step 36) before the searching of suffix-type derivatives, for this will make the extraction of the suffix easier. The first letter of the transposed suffix will define a section of searching region in the look-up table. (Step 38) Then a searching method will be employed to find out from this region suffixes that are identical to the first n letters of the transposed inquiry item, where n is a natural number starting by 1 and running up in order (Step 40 and 44). This procedure stops once no identical suffixes could be found in the table (Step 42). One then obtains a set of reversion rules for the derivative suffixes if there is any. (Step 46) Otherwise, the inquiry will be treated as no suffix transformation. (Step 52)

However, in this and the following searching procedures, the maximal matching principle (MMP) is used to identify the possible affixes. This principle states that when a number of possible derivative affixes are found in the look-up table in one affix-type searching procedure (suffix and infix respectively) for an inquiry item, only the one with the maximal number of letters is kept for providing the reversion rule.

Therefore, only one reversion rule is left (Step 48) after the above suffix-type derivative searching, if there is any, and a set of possible etymons is given by replacing the suffix in the inquiry phrase with the associated possible etymon suffixes (Step 50).

Next, according to FIG. 4B, take off the first letter and the suffix from the inquiry item to obtain the infix. (Step 54) Again, employ a searching method for these infix letters in the infix reversion table. (Step 56 and 60) Now, another set of transformation rules, if any is obtained. (Step 62) Apply the maximal matching principle again to obtain the reversion rule (Step 64) to substitute the infixes in the previously found candidate etymons (Step 66). Otherwise, it will be considered that no infix has been changed in the inquiry phrase. (Step 68)

Figure 4C:
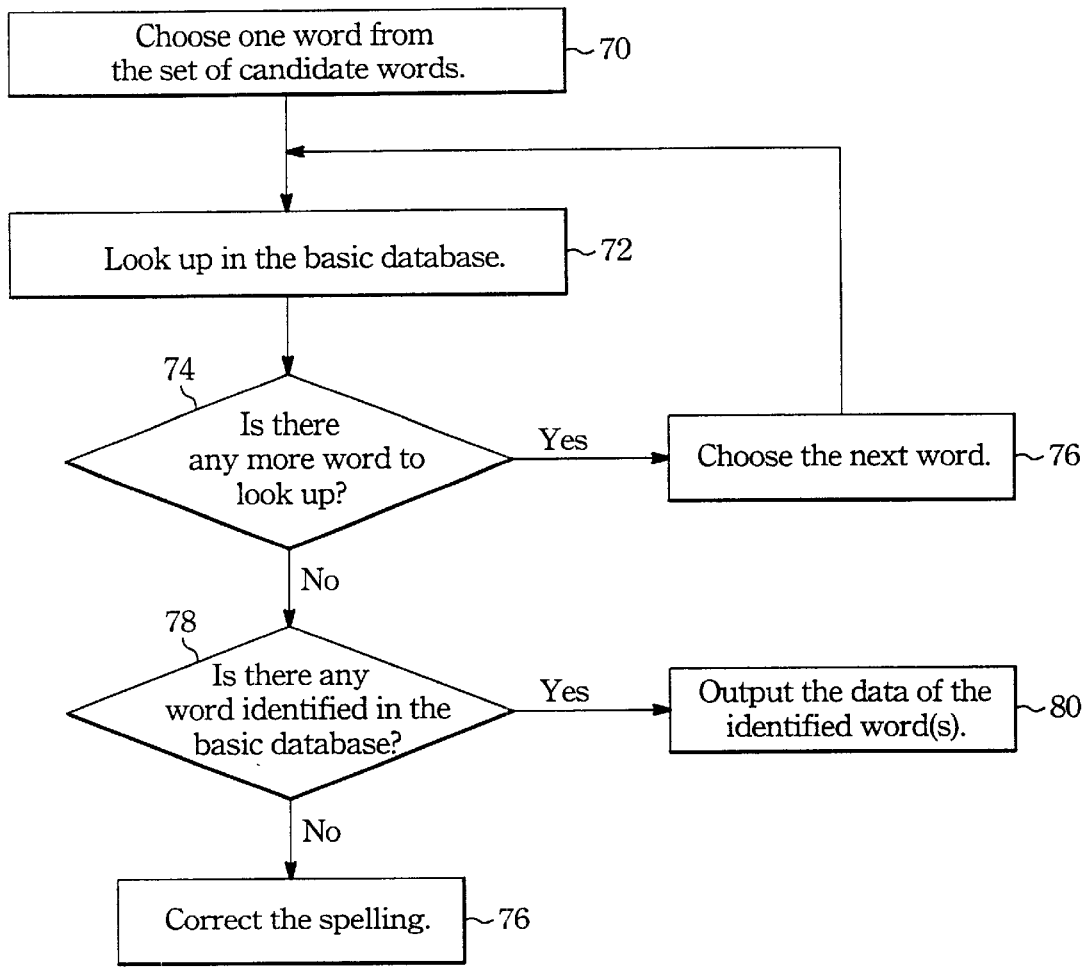
FIG. 4C is a flow chart of the subroutine for identifying the possible etymons from the set of candidate phrases.

Finally, combine the results of the above two searches (suffix and infix) to form a new set of possible etymons for further comparison with the basic database. This comparison, as outlined in FIG. 4C, starts by picking out each of the candidates from the new set of phrases and looking it up in the basic database until all of phrases have been checked. (Step 70, 72, 74 and 76) If any of them could be identified, then output the etymon along with its relevant data; if multiple candidates are identified, a list of these candidates will be provided to the use for selection. (Step 80)

Otherwise, the inquiry item will be sent to the spelling correction subroutine (Step 82) because no possible etymon could be formed, i.e., no suffix or infix reversion rule has been found. The closest phrases in spelling or pronunciation will be output for the user to select. (Step 20)

The whole process ends with outputting the data for the inquiry item, whether it is the possible etymon(s) or a spelling-corrected phrase. (Step 22)

The following takes 'quiero' as an example to explain how the present invention proceeds. Suppose the inquiry item 'quiero' is not included in the basic database of the dictionary, then it will temporarily be considered as a possible derivative candidate and go through the following procedures.

In the beginning, the suffix searching will be employed for the inquiry item. (FIG. 4A) Pursuant to the instant invention, 'quiero' will be transposed as 'oreiup' for the suffix searching (Step 36), and we obtain that now the "suffixes" could be 'o', 'or', 'ore', etc, which are the transpositions of the original suffixes. Since the first letter is 'o', thus the 'o-' section indexed, according to the preferred embodiment of the present invention, between rules 74 and 96 in the look-up table will be singled out (Step 38) for the [binary] search of identical "suffixes".

First, the first letter 'o' in the transposed phrase will be picked out for comparison with the selected section in the look-up table (Step 40), thus the reversion rule {'o'→'ar', 'er', 'ir', 'r'} is found. Then the next letter 'r' will be included with 'o' to form 'or' (Step 44) for further comparison with the table. However, there is no reversion rule for 'or' and this derivative suffix searching procedure thus stops (Step 42). A preferred searching method in this embodiment is any kind of conventional searching methods.

Therefore, in this example 'o' is the only possible "suffix" in accordance with the maximal matching principle (Step 48), which in turn means that 'o' is a possible suffix of the candidate derivative. The procedure is continued by replacing the suffix 'o' in the original inquiry item with 'ar', 'er', 'ir', and 'r' following the reversion rule for 'o'. Finally, a first set of possible etymons, {quierar, quierer, quierir, quierr}, is formed for further comparison with the basic database. (Step 50)

The next procedure is to do the infix searching. (FIG. 4B) First, obtain the infix part 'uier' by getting rid of the first letter and the maximal matched suffix 'o' in the inquiry phrase, quiero. (Step 54) The searching starts by drawing 'u' for matching (Step 56), but no infix reversion rule exists for 'u'. 'i' then is pulled out for comparison (Step 58) and {'i'→'e'} rule is found (Step 56). Nonetheless, this comparison procedure has to continue until no further reversion rules can be obtained. (Step 60) After all the comparisons, two reversion rules, {'i'→'e'} and {'ie'→'i', 'e'}, are found. (Step 62) Pursuant to the maximal matching principle, 'ie' is the maximal matched infix. So, only the rule {'ie'→'i', 'e'} is kept and used for substitution. (Step 64) A second set of possible etymons is thus formed from the first set by substituting 'i' and 'e' for 'ie'. (Step 66)

Now the complete set of possible etymons is the union of the first and the second sets of possible etymons formed previously, i.e., {quierar, quierer, quierir, quierr, querar, querer, querir, querr, quirar, quirer, quirir, quirr}.

Each of this new set of phrases is singled out (Step 70 in FIG. 4C) for further searching in the basic database (Step 72) until all the candidates have been checked (Step 74). In this example, only 'querer' is found to be a reasonable etymon of 'quiero' (Step 78), so it is output to the user (Step 80).

Figures 5A, 5B, 5C, 5D:
FIG. 5A, 5B, 5C and 5D are a series of screens extracted from our product, Oxford Spanish Electronic Dictionary, demonstrating the procedures from inputting, searching, to outputting when taking 'quiero' as the example.

FIG. 5A is an image of the screen of our product, Oxford Spanish Electronic Dictionary, when the user is inputting his inquiry item, 'quiero'. At the same moment, the electronic dictionary lists the closest phrases in spelling. FIG. 5B is the screen at the end of inputting. FIG. 5C shows that the electronic dictionary is searching with a message showing on the screen. FIG. 5D is the result of this search.

With the help of the instant invention, a lot of memory in the electronic dictionary can be saved. For instance, about 500,000 phrases can be recognized with only 18,361 phrases being collected in the Oxford Spanish Electronic Dictionary and occupying 161KB of ROM. Otherwise, collecting all the 500,000 phrases would need 4MB of ROM, the difference is a factor of about 25.

While the above gives a full description of a specific embodiment, the scope of the present invention should nevertheless be limited thereby. As the essence of the invention is in the creation of a look-up table for affix reversion rules along with a corresponding searching method, various modifications can be made upon the table and alternative searching methods can be used instead. The purview of the invention should be defined by the following claims.

What is claimed is:

1. A derivative identification method, which comprises:

building a vocabulary database;

creating a first table comprising a plurality of derivative suffixes, wherein each of said plurality of derivative suffixes is associated with a plurality of substitutive etymon suffixes;

creating a second table comprising a plurality of derivative infixes, wherein each of said plurality of derivative infixes is associated with a plurality of substitutive etymon infixes;

inputting an inquiry phrase;

extracting a derivative suffix that has most letters and exists in said first table from said inquiry phrase;

obtaining said plurality of substitutive suffixes associated with said extracted derivative suffix;

generating a first set of phrases by replacing said extracted derivative suffixes with said plurality of substitutive suffixes for said inquiry phrase;

extracting a common derivative infix that has most letters and exists in said second table from said inquiry phrase;

obtaining said plurality of substitutive infixes associated with said extracted common derivative infix;

generating a second set of phrases by replacing said extracted common derivative infix with said plurality of substitutive infixes;

creating a plurality of candidate phrases by combining said first set of phrases and said second set of phrases; and outputting said etymons.

2. The method of claim 1, wherein said vocabulary database comprises Spanish etymons.

3. The method of claim 1, wherein said first table is sorted alphabetically according to said derivative suffixes.

4. The method of claim 3, wherein said sorted derivative suffixes are further indexed by dividing them into groups.

5. The method of claim 1, wherein said second table is sorted alphabetically according to said derivative infixes.

6. The method of claim 5, wherein said sorted derivative infixes are further indexed by dividing them into groups.

7. The method of claim 1, wherein said derivative suffixes in said first table are transposed in letter order and said extracted derivative suffix is also transposed in letter order while extracting.

8. The method of claim 1, wherein said extracted derivative suffix is obtained by keeping the one with most letters and found in a searching for all derivative suffixes of said inquiry phrase in said first table.

9. The method of claim 1, wherein said extracted common derivative infix is obtained by keeping the one with most letters and found in a searching for all derivative infixes of said inquiry phrase in said second table.

10. A derivative identification method, which comprises:

building a vocabulary database;

creating a first table comprising a plurality of derivative suffixes, wherein each of said plurality of derivative suffixes is associated with a plurality of substitutive etymon suffixes;

creating a second table comprising a plurality of derivative infixes, wherein each of said plurality of derivative infixes is associated with a plurality of substitutive etymon infixes;

inputting an inquiry phrase;

extracting a derivative infix that has most letters and exists in said second table from said inquiry phrase;

obtaining said plurality of substitutive infixes associated with said extracted derivative infix;

generating a first set of phrases by replacing said extracted derivative infixes with said plurality of substitutive infixes for said inquiry phrase;

extracting a common derivative suffix that has most letters and exists in said first table from inquiry phrase;

obtaining said plurality of substitutive suffixes associated with said extracted derivative suffix;

generating a second set of phrases by replacing said extracted common derivative suffix with said plurality of substitutive suffixes;

creating a plurality of candidate phrases by combining said first set of phrases and said second set of phrases; and outputting said etymons.

11. The method of claim 10, wherein said vocabulary database comprises Spanish etymons.

12. The method of claim 10, wherein said first table is sorted alphabetically according to said derivative suffixes.

13. The method of claim 12, wherein said sorted derivative suffixes are further indexed by dividing them into groups.

14. The method of claim 10, wherein said second table is sorted alphabetically according to said derivative infixes.

15. The method of claim 14, wherein said sorted derivative infixes are further indexed by dividing them into groups.

16. The method of claim 10, wherein said derivative suffixes in said first table are transposed in letter order and said extracted derivative suffix is also transposed in letter order while extracting.

17. The method of claim 10, wherein said extracted common derivative suffix is obtained by keeping the one with most letters and found in a searching for all derivative suffixes of said inquiry phrase in said first table.

18. The method of claim 10, wherein said extracted derivative infix is obtained by keeping the one with most letters and found in a searching for all derivative infixes of said inquiry phrase in said second table.

* * * * *